Oct. 20, 1931. L. M. KERN 1,828,668
HOLDER
Filed Sept. 16, 1930

INVENTOR
LILLIAN M. KERN

BY
ATTORNEY.

Patented Oct. 20, 1931

1,828,668

UNITED STATES PATENT OFFICE

LILLIAN M. KERN, OF PORTLAND, MAINE

HOLDER

Application filed September 16, 1930. Serial No. 482,197.

In preparing certain case contained products, such as sausage, the handling of the case has been one of serious problem. Originally such products were prepared by packing in material encasements such as the intestinal walls or other membranous tubes or enclosures available as by-products of animals of slaughter.

Lately these organic or animal casings have been superseded to some extent at least by artificial replacements. These are of the cellulose type and while reproducing largely the physical desired properties of the natural casing, have many advantages so that the current practice tends to the artificial casement or casing for such products as are of the stuffed meat or sausage type.

Such products are so well known as to need no catalog. With different nationalities the specific articles may vary but the type remains the same. Generally speaking, the type is an animal filling (meat or fish) comminuted and mixed or unmixed as a filler or stuffing in a thin or membranous casing.

Such products are usually stuffed, smoked, boiled, cooled or otherwise mechanically or methodically treated or processed.

Taking such a product as the so-called sausage, for example, what is called in this country a bologna or a Bologna sausage, the problem is generally as follows. This is not to be understood as limiting, but as illustrative. In such case we have a relatively large product of generally cylindrical but elongated form. It is of heavy material, such as meat or mixed meat and cereal or other products. Such have to be packed in a moist or at least only partly dry condition. The article must be capable of handling without rupture and treated so that it can be kept for reasonable periods without deterioration or spoiling.

The present invention contemplates either natural or artificial encasements. These differ in structural characteristics. Both lack longitudinal strength, although the natural casing being without the curve of intestinal encasements presents a different problem as to longitudinal support. Laterally both types require lateral support in process.

One problem and one considerable item of expense has been that of lateral reenforcement. For both natural and artificial types of sausage (or the like) encasement windings or lashings have been necessary. These have been put on by hand as servings in half hitches or like cordal envelopments. Such take much time, as hand operations and skill are predominant factors.

To avoid the difficulty, metal cages have been provided but these are expensive and cumbersome. They require cleaning after use and take up a very large storage space. Moreover, inevitable edges, roughness or projecting points cause puncture and loss of product and wastage.

It is to be borne in mind also that such articles as sausage are not easy to handle. When moist they are slippery and difficult to hold.

My invention provides the desired results in the form of a holder of extremely simple but effective form. It is expansible to receive the article, contractible to grip it firmly and longitudinally supporting so that the sausage can be hung for boiling, smoking, or cooling. When not in use hundreds can be stored in a small space. Being inexpensive an ample equipment may be had, thus avoiding delays while giving full time for all steps of the processing or packing.

According to the concept of my invention instead of using the usual cord wrapping or whipping served in half hitches and drawn tight, I use a mesh so disposed as to come and go both circumferentially and longitudinally. This has proven a simple solution for the lateral and axial problems of manufacture of sausage and like encased products.

As illustrative of my invention and of the method and characteristic means for its practice I have provided in the accompanying drawings in Fig. 1 a view showing somewhat schematically the step of aligning a sausage in a holder.

Fig. 2 a similar view showing the holder elongated and contracted about the sausage.

Fig. 3 showing the investment completed by the end fastening.

In practice, the sausages S such as bologna or like larger type products are filled and end tied as at s. Whether in the natural casings or in the artificial, the products is then a generally cylindrical, heavy article contained within a very thin or membranous skin, easy to rupture and having neither lateral or axial strength.

Before such a product can be handled commercially, it must be protected against rupture. For the purposes of such protection as before suggested and in lieu of the cord or twine wrapping or whipping, a reticulation of cord or like strands is provided. This I preferably make in the form of a holder closed at one end as by a ring 2. This ring 2 which is preferably of fibre, rubber, or composition stock is smaller than the end of the sausage S but large enough to receive and center the axial or end tie s for the reasons to be explained.

It also is a convenient base for the development of the mesh which comprises generally rectangular reticulations 3 disposed with their diagonal axes parallel to the vertical axis of the ring center and thus generally longitudinal of the holder which they form.

This holder is therefore in the preferred form shown closed at the ring or centering end and free or open at its opposite end. That is to say, when the holder is opened up as in Fig. 1 to receive the sausage it flares out and may be stretched, the meshes 3 becoming more or less diamond shape laterally. This automatically shortens the holder as it opens it up to receive the sausage end which is end centered with its end ties within the ring 2, thus making it an end thrust bearing supporting the somewhat conical end of the sausage which enters it.

Figure 1:
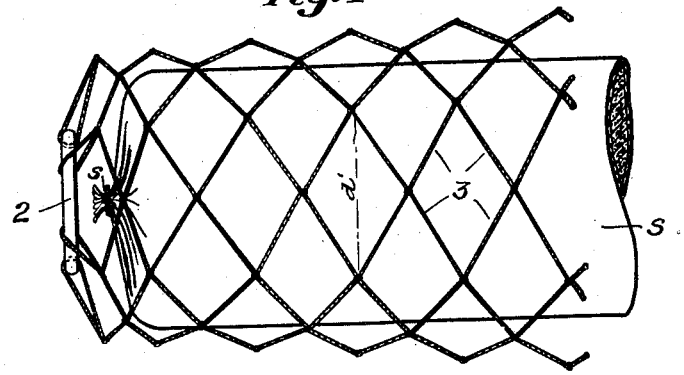
Figure 2:
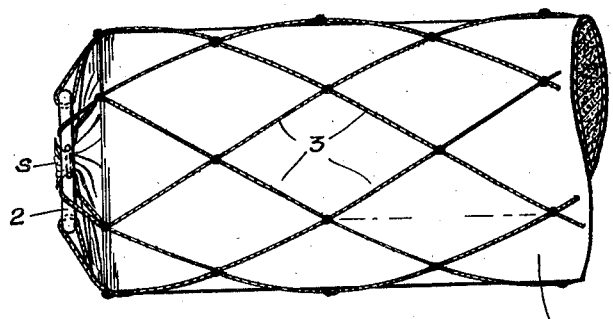
Figure 3:
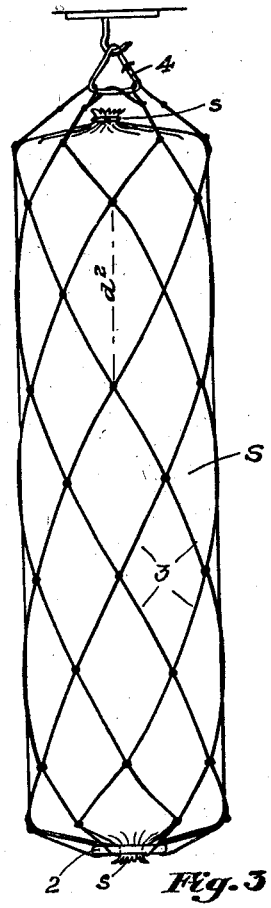
Figure 5:
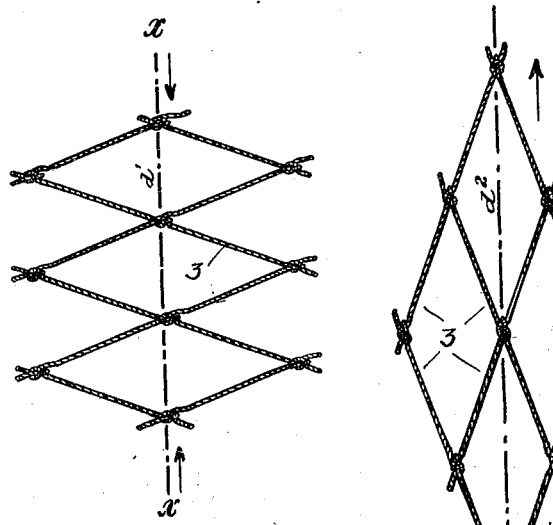
Figs. 5 and 6 are enlarged details showing the opposed movements of the mesh.
Figure 6:
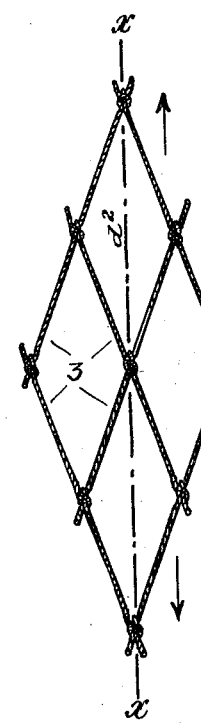
Figure 4:
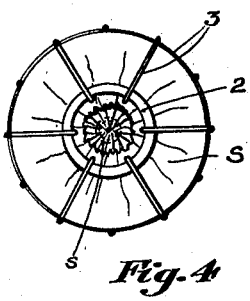
Fig. 4 is a bottom plan view of the arrangement of Fig. 3.

When thus positioned the holder is pulled longitudinally of the sausage and stretched until the meshes are reversed as to the major length of diagonal from corner to corner. That is, when they are receiving the sausage their major diagonal is lateral or circumferential of the sausage as at $d^1$ (Figs. 1 and 5). When in place and investing the sausage S longitudinally the mesh diagonal is reversed as at $d^2$ so as to be longitudinal or parallel to the axis $x-x$ of the sausage (Figs. 3 and 6). When so positioned on the sausage the mesh is drawn close circumferentially to grip or sustain the side walls and is tied as by the latchet 4 at the free or open end to tension the reticulation.

In this position with the major diagonal drawn longitudinal and the investment secured at the end there is a firm axial or longitudinal support so that the enclosed sausage may be hung from either end. At the same time there is a laterally compressive resultant by which the casing and the enclosed content is firmly but gently pressed and sustained.

The method as applied to this industry is astonishingly effective and economical. The holder considered generally is a net or bag and rectangular meshed nets are generally speaking of the most common type. Such are all old and well known yet applicant believes that no one has conceived the possibility of employing a meshed holder on this principle for meeting this old and long standing problem which has been the cause of so much trouble to the manufacturer of sausages and like articles.

What I therefore claim and desire to secure by Letters Patent is:—

1. That method of preparing a sausage or like encased end tied article of food for curing and cooking without the usual lashing or winding, consisting in inserting it longtudinally into a reticulated holder of flexible strands having a substantially rectangular mesh disposed with the mesh diagonals longitudinally of the holder, in stretching the mesh longitudinally of the article to elongate the longitudinal diagonal dimension of the mesh and to laterally narrow the same to invest the sausage tightly and sustain its casing laterally, and in securing the open end axially to sustain the sausage with the said mesh at substantially maximum diagonal extension whereby the sausage may be vertically suspended for processing.

2. A method for axially suspending a sausage, bologna or like encased food article in a manner to automatically re-enforce its encasement both longitudinally and transversely, consisting in providing an adjustable substantially cylindrical meshwork having a closed lower end and an open upper end designed to be hung upon a support, expanding said meshwork to freely receive the encased article, and then contracting said meshwork uniformly about said article by permitting said article to bear downwardly upon said closed end in response to the action of gravity.

In testimony whereof I affix my signature.

LILLIAN M. KERN.